United States Patent
Kim et al.

(10) Patent No.: US 11,656,772 B2
(45) Date of Patent: May 23, 2023

(54) MEMORY CONTROLLER AND STORAGE DEVICE INCLUDING THE SAME

(71) Applicant: FADU Inc., Seoul (KR)

(72) Inventors: Hongseok Kim, Seoul (KR); Sang Hyun Park, Hwaseong-si (KR); Sunggil Hong, Seoul (KR); Hayoung Lim, Seoul (KR); EHyun Nam, Seoul (KR)

(73) Assignee: FADU Inc., Seoul (KR)

( * ) Notice: Subject to any disclaimer, the term of this patent is extended or adjusted under 35 U.S.C. 154(b) by 0 days.

(21) Appl. No.: 17/359,935

(22) Filed: Jun. 28, 2021

(65) Prior Publication Data

US 2022/0004326 A1    Jan. 6, 2022

Related U.S. Application Data (60) Provisional application No. 63/046,780, filed on Jul. 1, 2020.

(30) Foreign Application Priority Data

Jul. 1, 2020  (KR) .......................... 10-2020-0080803

(51) Int. Cl.
*G06F 3/06* (2006.01)
(52) U.S. Cl.
CPC .......... *G06F 3/0625* (2013.01); *G06F 3/0604* (2013.01); *G06F 3/0619* (2013.01); *G06F 3/0623* (2013.01); *G06F 3/0659* (2013.01); *G06F 3/0661* (2013.01); *G06F 3/0679* (2013.01)

(58) Field of Classification Search
CPC .... G06F 3/0619; G06F 3/0623; G06F 3/0625; G06F 3/0659; G06F 3/0661; G06F 3/0679; G06F 12/0246; G06F 3/0604; G06F 3/0655; G06F 3/0656; G06F 3/0658
See application file for complete search history.

(56) References Cited

U.S. PATENT DOCUMENTS

| | | | |
|---|---|---|---|
| 8,261,159 B1 * | 9/2012 | Sommer | G06F 11/1048 713/193 |
| 8,482,993 B2 * | 7/2013 | Strasser | G06F 3/0659 365/189.11 |
| 2005/0008150 A1 | 1/2005 | Liang | |
| 2008/0215798 A1 | 9/2008 | Sharon et al. | |

(Continued)

FOREIGN PATENT DOCUMENTS

| | | |
|---|---|---|
| KR | 10-0694978 B1 | 3/2007 |
| KR | 10-2010-0111990 A | 10/2010 |

(Continued)

OTHER PUBLICATIONS

A Case for Toggle-Aware Compression for GPU Systems by Pekhimenko (Year: 2016).*

*Primary Examiner* — Paul M Knight
(74) *Attorney, Agent, or Firm* — NSIP Law

(57) ABSTRACT

A memory controller and a storage device including the same are provided. The memory controller generates a plurality of scrambled data by randomizing input data, counts the number of toggles per bit of each scrambled data, and writes one scrambled data with a smallest number of toggles in a non-volatile memory.

7 Claims, 4 Drawing Sheets

(56) References Cited

U.S. PATENT DOCUMENTS

| | | | | |
|---|---|---|---|---|
| 2016/0124883 A1* | 5/2016 | Thompson | ............... | H04L 47/39 |
| | | | | 710/110 |
| 2016/0188523 A1* | 6/2016 | Teoh | ........................ | G06F 21/79 |
| | | | | 710/105 |
| 2017/0322749 A1* | 11/2017 | Qawami | ............ | G11C 13/0061 |
| 2020/0273508 A1* | 8/2020 | Srinivasan | ............. | G11C 16/24 |

FOREIGN PATENT DOCUMENTS

| KR | 10-1121346 B1 | 3/2012 |
|---|---|---|
| KR | 10-2013-0052811 A | 5/2013 |
| KR | 10-2017-0098804 A | 8/2017 |
| KR | 10-2017-0128686 A | 11/2017 |

\* cited by examiner

MEMORY CONTROLLER AND STORAGE DEVICE INCLUDING THE SAME

CROSS-REFERENCE TO RELATED APPLICATIONS

This application claims the benefit under 35 USC § 119(e) of U.S. Provisional Application No. 63/046,780 filed on Jul. 1, 2020, and the benefit under 35 USC § 119(a) of Korean Patent Application No. 10-2020-0080803 filed on Jul. 1, 2020, in the Korean Intellectual Property Office, the entire disclosures of which are incorporated herein by reference for all purposes.

BACKGROUND

1. Field

The disclosure relates to a memory controller and a storage device including the same, and more particularly, to a memory controller that reduces input/output power consumption during data transmission to and from a non-volatile memory device, and a storage device including the memory controller.

2. Description of Related Art

Semiconductor memories are categorized into volatile memory and non-volatile memory according to the storage mechanisms of information. Volatile memories include dynamic random access memory (DRAM) and static random access memory (SRAM). Although the volatile memory provides fast read and write speeds, the volatile memory loses stored information when it is powered off. In contrast, the non-volatile memory maintains its stored information even after it is powered off and thus is used as a storage medium for persistent storage devices such as solid-state drives (SSDs). Non-volatile memories include erasable programmable read only memory (EPROM), electrically erasable programmable read only memory (EEPROM), ferroelectric RAM (FRAM), phase change RAM (PRAM), magnetoresistive RAM (MRAM), and flash memory. Particularly, the flash memory is widely used as an audio and video data storage medium for information devices such as a computer, a smartphone, a digital camera, a voice recorder, and a camcorder.

The density of a non-volatile memory, especially a flash memory has been increasing by reducing cell size and circuit line width through technology node shrink and introducing multi-level cell (MLC) technology that stores multiple bits per cell. However, since the decrease of the circuit line width brought by the technology node shrink leads to vulnerability to cell-to-cell interference, cell-to-cell interference occurs during data write to a memory. The degree of interference depends on a data bit value written to a cell, and when data with consecutive bit values having severe interference is written, a bit-flip error may occur in other data which have already been written. To avert this problem, a technique of scrambling data and transmitting and writing the scrambled data to a memory has been developed.

Input/output power consumed during data transmission between a memory controller and a non-volatile memory is related to the number of toggles per data bit. As the number of toggles increases, the input/output power consumption also increases. Accordingly, when the number of toggles per bit of scrambled data increases in the process of scrambling input data through randomization, input/output power consumption increases during data transmission.

Accordingly, there is thus a pressing need for a method of solving the conventional problem of excessive input/output power consumption during transmission of scrambled data.

SUMMARY

The disclosure has been made in an effort to solve the above-mentioned problems of the prior art, and an aspect of the disclosure is to provide a memory controller for generating a plurality of scrambled data by scrambling input data, counting the number of toggles per bit in each scrambled data, and writing data with a minimum number of toggles among the scrambled data to a non-volatile memory.

According to an embodiment of the disclosure, a memory controller includes a scrambler configured to generate at least two scrambled data by randomizing original data received from a host, a toggle counter configured to count the numbers of toggles per bit of the at least two scrambled data generated by the scrambler, and a scrambled data output unit configured to compare the counted numbers of toggles with each other and output one scrambled data with a smallest number of toggles among the at least two scrambled data. The one scrambled data output from the scrambled data output unit may be programmed in a non-volatile memory device.

In the memory controller according to an embodiment of the disclosure, the scrambler may include at least one scrambling unit including a random sequence generator configured to generate at least two random sequences by using at least two different seeds, and at least two logic operators configured to exclusive-OR (XOR)-operate the at least two generated random sequences and the original data, and configured to generate the at least two different scrambled data.

In the memory controller according to an embodiment of the disclosure, a plurality of scrambling units may be provided and generate the different scrambled data by using different algorithms.

In the memory controller according to an embodiment of the disclosure, the scrambler may add, to each of the scrambled data, information about a scrambler and a seed used to generate the scrambled data.

In the memory controller according to an embodiment of the disclosure, the scrambler may include a plurality of scrambling units each including a random sequence generator configured to generate one random sequence by using one seed, and a logic operator configured to XOR-operate the generated random sequence and the original data. The plurality of scrambling units may generate the different scrambled data by using different algorithms.

In the memory controller according to an embodiment of the disclosure, the scrambler may add, to each of the scrambled data, information about a scrambling unit and a seed used to generate the scrambled data.

According to an embodiment of the disclosure, a storage device includes a non-volatile memory device in which data is programmed, and a memory controller configured to generate a plurality of scrambled data by randomizing original data received from a host and program one scrambled data with a smallest number of toggles per bit among the plurality of generated scrambled data in the non-volatile device.

The features and advantages of the disclosure will become more apparent from the following description based on the attached drawings.

The terms or words used in the specification and claims should not be interpreted in a conventional and lexical sense. Rather, they should be interpreted as meanings and concepts consistent with the technical idea of the disclosure based on the principle that the inventor can appropriately define the concept of terms in order to explain his or her invention in the best way.

According to the disclosure, input/output power consumption may be reduced by decreasing the number of toggles during data transmission between a memory controller and a non-volatile memory device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The objects, specific advantages, and novel features of the disclosure will become more apparent from the following detailed description and preferred embodiments, examples of which are illustrated in the accompanying drawings. The same reference numerals and signs denote the same or like components even when they are shown in different accompanying drawings from one another. The term as used in the disclosure, "$1^{st}$", "$2^{nd}$", "first" or "second' may be used for the names of various components, not limiting the components. These expressions are used only to distinguish one component from another component. Lest it should obscure the subject matter of the disclosure, a detailed description of well-known technologies is avoided.

Preferred embodiments of the disclosure will be described below in detail with reference to the attached drawings.

Figure 1:
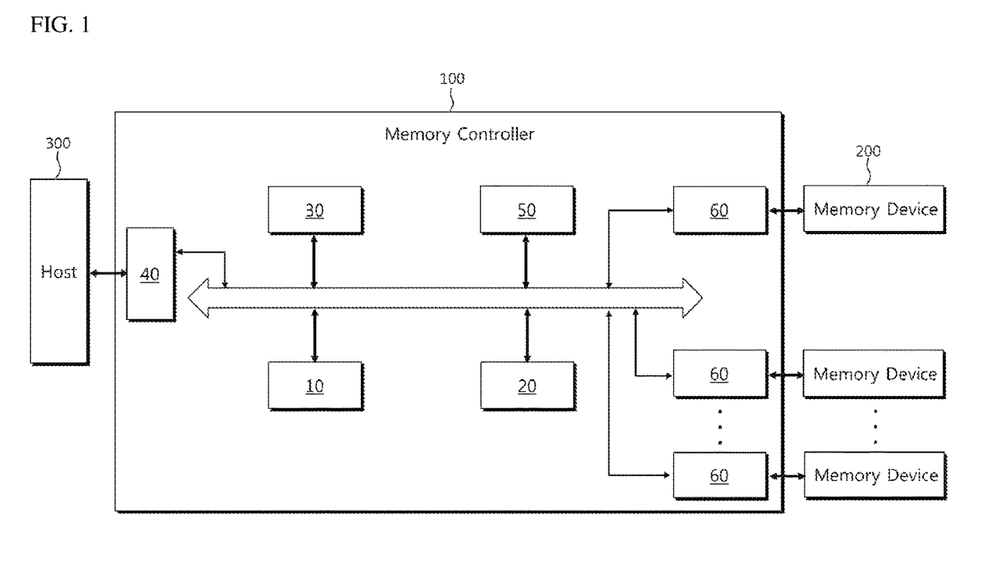
FIG. 1 is a block diagram illustrating a memory controller according to an embodiment of the disclosure.
Figure 2:
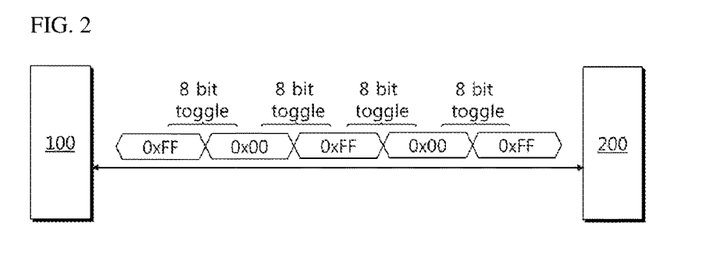
FIGS. 2 and 3 are block diagrams illustrating the number of toggles per bit in data transmitted from a memory controller to a non-volatile memory device according to an embodiment of the disclosure.
Figure 3:
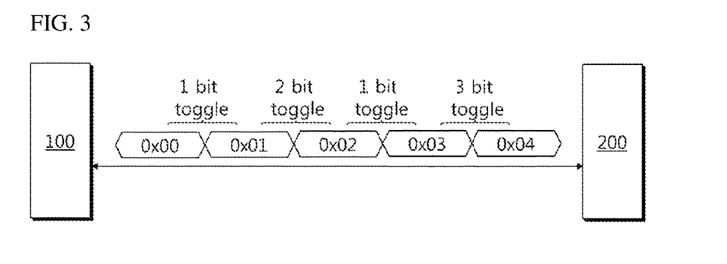

FIG. 1 is a block diagram illustrating a memory controller according to an embodiment of the disclosure, and FIGS. 2 and 3 are block diagrams illustrating the number of toggles per bit in data transmitted from the memory controller to a non-volatile memory device according to an embodiment of the disclosure.

Referring to FIG. 1, a memory controller 100 according to an embodiment of the disclosure includes a scrambler 10 that generates at least two scrambled data by randomizing original data received from a host 300, a toggle counter 20 that counts the number of toggles per bit in the at least two scrambled data generated by the scrambler 10, and a scrambled data output unit 30 that outputs one scrambled data with a smallest number of toggles among the at least two scrambled data by comparing the counted numbers of toggles. The one scrambled data output from the scrambled data output unit 30 is programmed to a non-volatile memory device 200.

The disclosure relates to the memory controller 100 that controls the non-volatile memory device 200. The memory controller 100 may control the non-volatile memory device 200 in response to a request from the host 300. For example, the memory controller 100 may control the non-volatile memory device 200 to read stored data or write data in response to a data operation request received from the host 300. The host 300 may transmit the data operation request and an address to the memory controller 100 and exchange data with the memory controller 100. For example, the host 300 may exchange data with the memory controller 100 in conformance to at least one of various interface protocols such as a universal serial bus (USB) protocol, a multi-media card (MMC) protocol, a peripheral component interconnection (PCI) protocol, a PCI-express (PCI-E) protocol, an advanced technology attachment (ATA) protocol, a Serial-ATA protocol, a Parallel-ATA protocol, a small computer system interface (SCSI) protocol, an enhanced small disk interface (ESDI) protocol, an integrated drive electronics (IDE) protocol, a mobile industry processor interface (MIPI) protocol, and a universal flash storage (UFS) protocol. The host 300 may include portable electronic devices such as a portable phone and a laptop computer, and electronic devices such as a desktop computer, a game console, and a TV.

The memory controller 100 may control write, read, and erase operations of the non-volatile memory device 200 by providing an address ADDR, a command CMD, and a control signal to the non-volatile memory device 200. Data for the operations may be transmitted and received between the memory controller 100 and the non-volatile memory device 200. The non-volatile memory device 200 may include NAND flash memory, vertical NAND (VNAND) flash memory, NOR flash memory, resistive random access memory (RRAM), phase-change random access memory (PRAM), magneto-resistive random access memory (MRAM), ferroelectric random access memory (FRAM), spin transfer torque random access memory (STT-RAM), and a combination thereof. The non-volatile memory device 200 may perform program (write), read, and erase operations in response to signals received from the memory controller 100.

Data scrambling is used in the non-volatile memory device 200 to increase reliability. Cell-to-cell interference may occur during data write to the non-volatile memory device 200. The degree of interference depends on a data bit value written to a cell, and when data with consecutive bit values having severe interference is written, a bit-flip error may occur in other data which have already been written. In this context, data is scrambled and then transmitted and written to the non-volatile memory device 200 to increase the reliability of the non-volatile memory device 200.

Input/output power consumed during data transmission between the memory controller 100 and the non-volatile memory 200 is related to the number of toggles per data bit. As the number of toggles increases, the input/output power consumption also increases. Accordingly, when the number of toggles per bit of scrambled data increases in the process of scrambling input data through randomization, input/output power consumption increases during data transmission. To solve the conventional problem, the memory controller 100 according to the disclosure has been devised.

Specifically, the memory controller 100 according to an embodiment of the disclosure includes the scrambler 10, the toggle counter 20, and the scrambled data output unit 30.

The scrambler 10 generates scrambled data by randomizing original data received from the host 300. The scrambled data may be generated by performing an exclusive-OR (XOR) operation between a random bit sequence and the original data. Herein, two or more scrambled data are generated. The plurality of scrambled data are generated as a result of randomizing the original data in different manners and thus have different bit values. The scrambled data are generated by the scrambler 10, which will be described later.

The toggle counter 20 counts the number of toggles per bit in each of the two or more scrambled data generated by the scrambler 10. As described before, input/output power consumption increases with the number of toggles per data bit during data transmission between the memory controller 100 and the non-volatile memory device 200.

FIG. 2 illustrates data transmission in which all bits of data are toggled each time, and FIG. 3 illustrates data transmission having a pattern in which a data bit value increases by one each time. It is assumed herein that a data bit width is 8 bits. In FIG. 2, an 8-bit toggle occurs between data 0xFF having a bit value of "1111 1111" and data 0x00 having a bit value of "0000 0000", and thus toggling occurs 32 times in total. In FIG. 3, a 1-bit toggle occurs between data 0x00 with a bit value of "0000 0000" and data 0x01 with a bit value of "0000 0001", a 2-bit toggle occurs between data 0x01 and data 0x02 with a bit value of "0000 0010", a 1-bit toggle occurs between data 0x02 and data 0x03 with bit value "0000 0011", and a 3-bit toggle occurs between data 0x03 and data 0x04 with a bit value "0000 0100". Therefore, toggling occurs 7 times in total. Accordingly, since the data transmission of FIG. 3 has a smaller number of toggles than that of FIG. 2, input/output power consumption is smaller.

As described above, as the number of toggles per data bit is smaller during data transmission, the input/output power consumption is also smaller. Therefore, the toggle counter 20 counts the number of toggles in each of a plurality of scrambled data, which is a prerequisite for selecting scrambled data that consumes less input/output power.

The scrambled data output unit 30 compares the numbers of toggles counted by the toggle counter 20 with each other, and outputs one of the plurality of scrambled data, which has a smallest number of toggles. The output scrambled data is programmed in the non-volatile memory device 200. In a read operation, the data is transmitted from the non-volatile memory device 200 to the memory controller 100, descrambled, and then transferred to the host 300. Accordingly, the scrambled data selected and output by the scrambled data output unit 30 may minimize input/output power consumption during data transmission between the memory controller 100 and the non-volatile memory device 200.

In summary, according to the disclosure, input/output power consumption may be reduced by decreasing the number of toggles during data transmission between the memory controller 100 and the non-volatile memory device 200.

The memory controller 100 according to the disclosure may further include a host interface 40 as a means for providing an interface with the host 300. The host interface 40 may be connected to the host 300 through one or more channels or ports. For example, the host interface 40 may be connected to the host 300 through any one or all of a parallel AT attachment (PATA) bus, a serial AT attachment (SATA) bus, and a peripheral component interconnect express (PCIe) bus, or to the outside through an SCSI, a USB, or the like.

The memory controller 100 according to the disclosure may further include a memory channel controller 60 as a means for providing an interface with the non-volatile memory device 200. Herein, at least one non-volatile memory device 200 may be provided, and a plurality of memory channel controllers 60 may be used to support the plurality of non-volatile memory devices 200. One or more non-volatile memory devices 200 may be connected to one memory channel controller 60 and share the same data bus.

The memory controller 100 according to the disclosure may further include a processor 50 that provides overall control to the operations of the memory controller 100 in order to process a data operation request from the host 300. The processor 50 may be implemented as a micro control unit (MCU), a central processing unit (CPU), or the like, and may control functions of the memory controller 100 by executing software.

Figure 4:
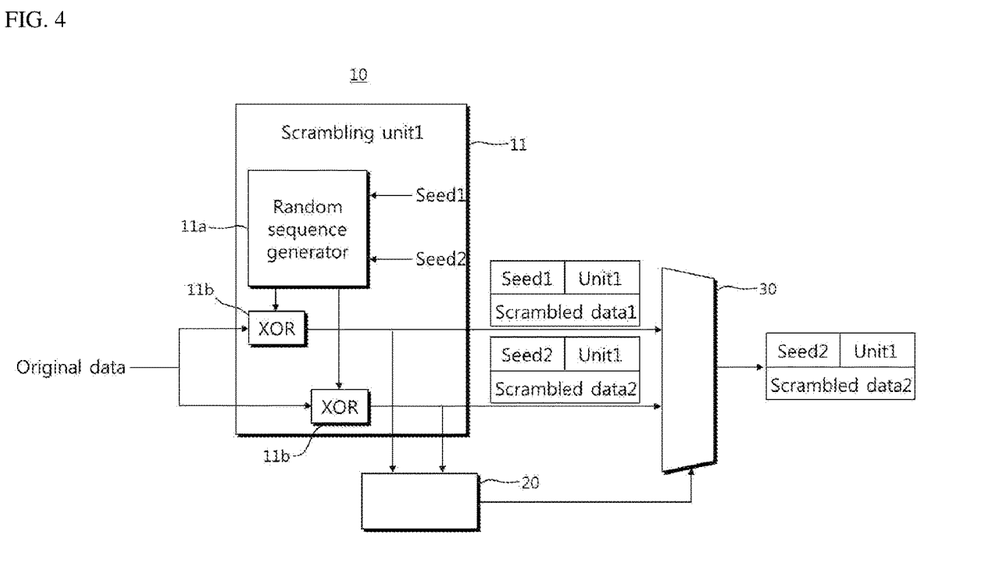
FIGS. 4, 5 and 6 are block diagrams illustrating operations of the memory controller according to different embodiments of the disclosure.
Figure 5:
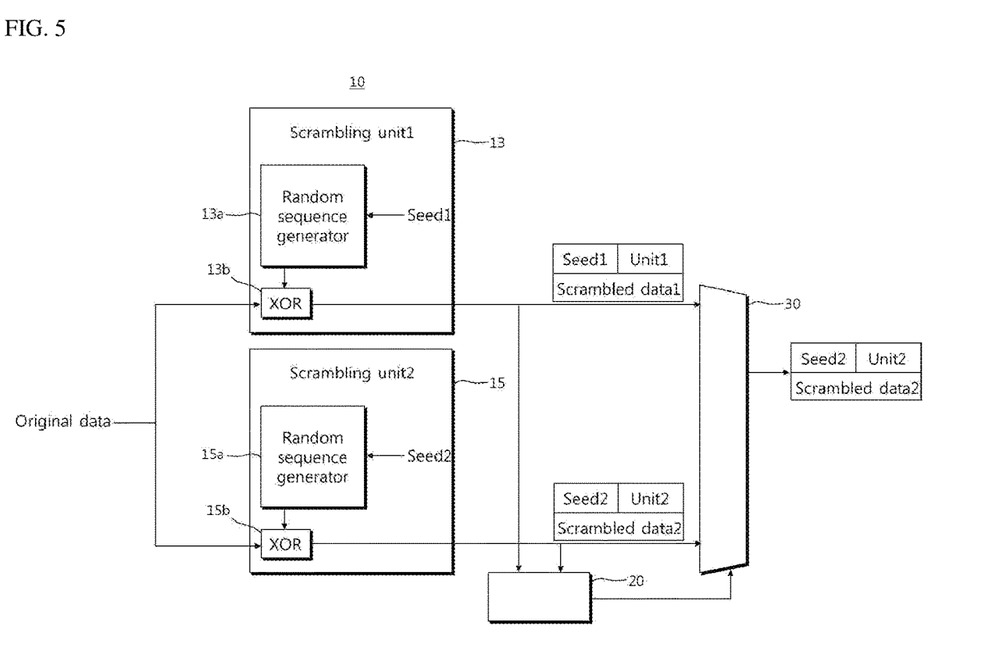
Figure 6:
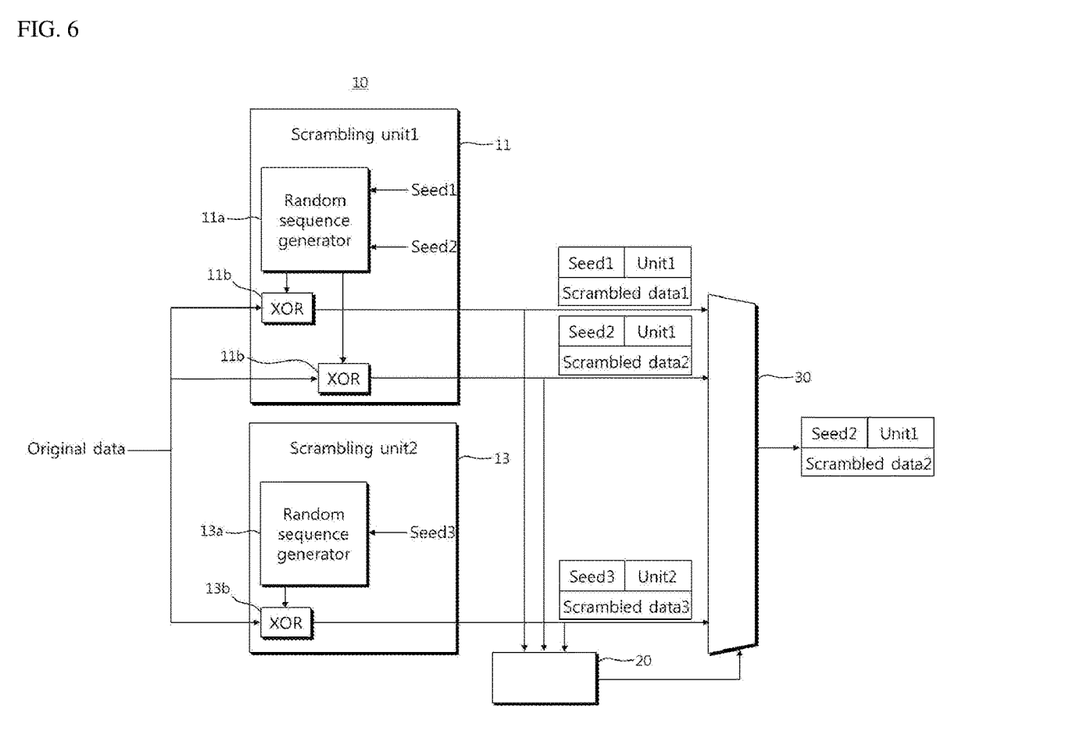

Now, a description will be given of the memory controller 100 operating according to various embodiments of the scrambler 10. FIGS. 4, 5 and 6 are block diagrams illustrating operations of the memory controller according to different embodiments of the disclosure.

The scrambler 10 according to the disclosure may include one or more scrambling units 11, 13, and 15, and generate a plurality of scrambled data using at least one of the scrambling units 11, 13 and 15.

FIG. 4 illustrates an embodiment of using a plurality of seeds in one scrambling unit. The scrambler 10 may include the scrambling unit 11. Referring to FIG. 4, the first scrambling unit 11 according to a first embodiment may include a random sequence generator 11a and two or more logic operators 11b. The random sequence generator 11a may generate random sequences using two or more different seeds, seed1 and seed2. As many different random sequences as the number of seeds may be generated. The logic operators 11b generate scrambled data by performing XOR operations between the random sequences and original data. Because the number of the logic operators 11b is equal to the number of seeds or random sequences, two or more different scrambled data may be generated by XOR-operating the original data with the two or more different random sequences, respectively. While two seeds and two logic operators 11b are shown in FIG. 4, more seeds or more logic operators 11b may be used to generate as many scrambled data as the number of seeds or logic operators 11b. For each of the plurality of generated scrambled data, the toggle counter 20 may count the number of toggles, and the scrambled data output unit 30 may compare the numbers of toggles with each other and output one scrambled data with a smallest number of toggles.

At least one first scrambling unit 11 may be provided according to the first embodiment. A plurality of first scrambling units 11 may generate different scrambled data by using different algorithms. Further, each of the first scrambling units 11 may use a different seed.

When a plurality of scrambling units 11 generate a plurality of scrambled data, the scrambler 10 may add information about a scrambler and a seed to each of the plurality of scrambled data. Therefore, any scrambled data selectively output from the scrambled data output unit 30 may be written to the non-volatile memory device 200, along with the information about a scrambling unit 11 and a seed by which the scrambled data has been generated, and descrambled based on the information.

FIG. 5 illustrates an embodiment of using a plurality of scramblers each using one seed. Referring to FIG. 5, the scrambler 10 may include a plurality of second scrambling units 13 and 15. Each of the second scrambling units 13 and 15 may include a random sequence generator 13a or 15a that generates one random sequence using one seed, seed 1 or seed 2, and a logic operator 13b or 15b that generates one scrambled data by XOR-operating the generated random sequence and original data. At least two second scrambling units 13 and 15 may be provided, each generating scrambled data. The at least two second scrambling units 13 and 15 may generate different scrambled data by using different algorithms or different seeds. While two second scrambling units 13 and 15 are shown in FIG. 5, as far as the number of second scrambling units is at least 2, there is no other special limitation on the number of the second scrambling units. The toggle counter 20 may count the number of toggles for each of the different scrambled data, and the scrambled data output unit 30 may selectively output scrambled data with a smallest number of toggles.

The scrambler 10 may add information about the scramblers 13 and 15 and the seeds used to generate the plurality of scrambled data, to the plurality of scrambled data, respectively, so that the scrambled data may be descrambled during a read operation.

FIG. 6 illustrates an embodiment of using the afore-described first scrambling unit and second scrambling unit in combination. The scrambler 10 may include at least one first scrambling unit 11 and at least one second scrambling unit 13. Each first scrambling unit 11 may generate as many scrambled data as the number of seeds, and the second scrambling unit 13 may generate one scrambled data. The toggle counter 20 may count the numbers of toggles for the respective scrambled data, and the scrambled data output unit 30 may selectively output one scrambled data with a smallest number of toggles. Herein, the scrambler 10 may add information about the scrambling units 11 and 13 and the seeds corresponding to the respective scrambled data, to the scrambled data.

The above-described scrambler 10, toggle counter 20, and scrambled data output unit 30 may be implemented in hardware or software, alone or in a combination of at least two of them. That is, the scrambler 10, the toggle counter 20, and the scrambled data output unit 30 may be implemented in the form of a digital or analog circuit located inside the memory controller 100, may be implemented as separate chips or modules and connected to the memory controller 100, or may be implemented by storing and executing software in an internal memory such as SRAM or an external memory such as floppy disk, compact disk, or USB flash drive. In addition, the scrambler 10, the toggle counter 20, and the scrambled data output unit 30 may be implemented in a user-programmable form or may be integrated into another built-in module (e.g., a processor).

The memory controller according to the disclosure may be applied to a storage device, which will be described below.

Figure 7:
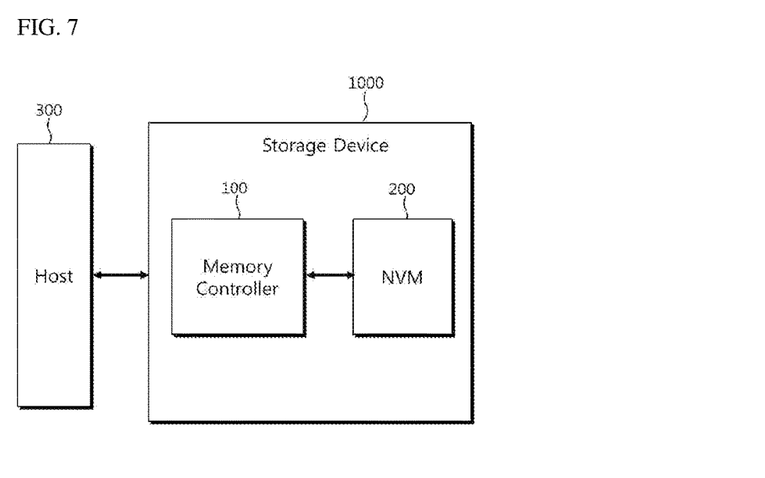
FIG. 7 is a block diagram illustrating a storage device according to an embodiment of the disclosure.
Figure 8:
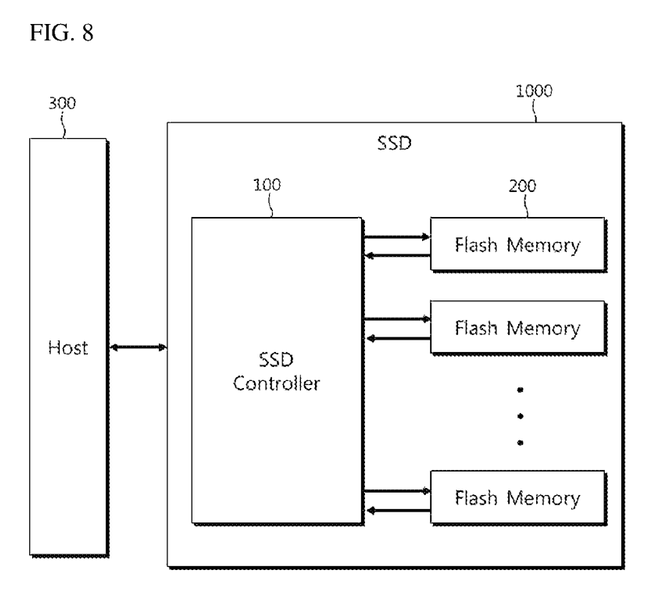
FIG. 8 is a block diagram illustrating a solid-state drive (SSD) to which the storage device is applied according to an embodiment of the disclosure.

FIG. 7 is a block diagram illustrating a storage device according to an embodiment of the disclosure, and FIG. 8 is a block diagram illustrating an example in which the storage device according to the embodiment of the disclosure is applied to a solid-state drive (SSD).

As illustrated in FIG. 7, a storage device 1000 according to an embodiment of the disclosure may include the non-volatile memory device 200 to which data is programmed, and the memory controller 100 which generates a plurality of scrambled data by randomizing original data received from the host 300 and programs one scrambled data with a smallest number of toggles per bit among the plurality of generated scrambled data to the non-volatile memory device 200.

The storage device 1000 may include a memory card or a detachable storage device. The storage device 1000 is connected to the host 300 and exchanges data with the host 300 via the host interface 40. The storage device 1000 may receive power from the host 300 and perform an internal operation.

The non-volatile memory device 200 may be implemented as a flash memory. The memory controller 100 may generate a plurality of scrambled data for original data by using a plurality of scrambling units and/or a plurality of scrambling seeds and selectively write one scrambled data with a smallest number of toggles to the non-volatile memory device 200, which has been described before and thus will not be described redundantly herein.

Referring to FIG. 8, the storage device 1000 according to the disclosure may be an SSD.

Since the SSD is connected to the host 300, the host 300 may write data to the SSD or read data stored in the SSD. The SSD may exchange signals with the host 300 via the host interface 40 and receive power through a power connector. The SSD may include a plurality of non-volatile memory devices 200 and an SSD controller. The non-volatile memory devices 200 may be implemented as PRAM, MRAM, ReRAM, FRAM, or the like in addition to flash memory, and the plurality of non-volatile memory devices 200 may be connected to the SSD controller through a plurality of channels. One or more non-volatile memory devices 200 may be connected to one channel, and the non-volatile memory devices 200 connected to one channel may be connected to the same data bus.

The memory controller 100 according to the disclosure is provided as an SSD controller and transmits and receives signals to and from the host 300 via the host interface. Commands, addresses, data, and so on may be transmitted in signals, and data is written to or read from a non-volatile memory device 200 according to a command from the host 300.

While the disclosure has been described in detail with reference to specific embodiments, the embodiments are intended only for describing the disclosure, not limiting the disclosure. It is apparent to those skilled in the art that many variations or modifications can be made without departing the scope and spirit of the disclosure.

Simple modifications and changes of the disclosure fall within the scope of the disclosure and the specific protection scope of the disclosure will become apparent from the appended claims.

What is claimed is:

1. A memory controller comprising:
   a scrambler configured to generate at least two scrambled data, having different bit values, by randomizing, in different manners, original data received from a host;
   a toggle counter configured to count the numbers of toggles per bit of the at least two scrambled data generated by the scrambler; and
   a scrambled data output unit configured to compare the counted numbers of toggles of the at least two scrambled data with each other and output one scrambled data with a smallest number of toggles among the at least two scrambled data, wherein the one scrambled data output from the scrambled data output unit is programmed in a non-volatile memory device, and wherein the toggles are changes between sequential bits in the at least two scrambled data.

2. The memory controller according to claim 1, wherein the scrambler comprises: at least one scrambling unit including a random sequence generator configured to generate at least two random sequences by using at least two different seeds, and at least two logic operators configured to exclusive-OR (XOR)-operate the at least two generated random sequences and the original data, and configured to generate the at least two different scrambled data.

3. The memory controller according to claim 2, wherein a plurality of scrambling units are provided and generate the different scrambled data by using different algorithms.

4. The memory controller according to claim 2, wherein the scrambler adds, to each of the scrambled data, information about a scrambler and a seed used to generate the scrambled data.

5. The memory controller according to claim 1, wherein the scrambler comprises:

a plurality of scrambling units each including a random sequence generator configured to generate one random sequence by using one seed, and a logic operator configured to XOR-operate the generated random sequence and the original data, wherein the plurality of scrambling units generate the different scrambled data by using different algorithms.

6. The memory controller according to claim 5, wherein the scrambler adds, to each of the scrambled data, information about a scrambling unit and a seed used to generate the scrambled data.

7. A storage device comprising:

a non-volatile memory device in which data is programmed; and the memory controller according to claim 1, configured to generate a plurality of scrambled data by randomizing original data received from a host and program one scrambled data with a smallest number of toggles per bit among the plurality of generated scrambled data in the non-volatile device.

* * * * *